United States Patent
Shen et al.

(10) Patent No.: US 11,080,203 B2
(45) Date of Patent: Aug. 3, 2021

(54) DATA STORAGE DEVICE AND CONTROL METHOD FOR NON-VOLATILE MEMORY

(71) Applicant: Silicon Motion, Inc., Jhubei (TW)

(72) Inventors: Yang-Chih Shen, Taoyuan (TW); Shih-Chang Chang, Miaoli County (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/573,409

(22) Filed: Sep. 17, 2019

(65) Prior Publication Data

US 2020/0272574 A1 Aug. 27, 2020

Related U.S. Application Data

(60) Provisional application No. 62/810,422, filed on Feb. 26, 2019.

(30) Foreign Application Priority Data

Aug. 2, 2019 (TW) .................................. 108127457

(51) Int. Cl.
*G06F 12/1009* (2016.01)
*G06F 12/0802* (2016.01)
*G06F 12/02* (2006.01)

(52) U.S. Cl.
CPC ...... *G06F 12/1009* (2013.01); *G06F 12/0292* (2013.01); *G06F 12/0802* (2013.01); *G06F 2212/7201* (2013.01)

(58) Field of Classification Search
CPC .............. G06F 12/0292; G06F 12/0802; G06F 12/0888; G06F 12/1027; G06F 3/0638–064; G06F 3/068; G06F 3/0688
See application file for complete search history.

(56) References Cited

U.S. PATENT DOCUMENTS

| 5,319,778 A | 6/1994 | Catino |
| 7,587,427 B2 | 9/2009 | Satou et al. |

(Continued)

FOREIGN PATENT DOCUMENTS

| TW | 201413453 A | 4/2014 |
| TW | 201712549 A | 4/2017 |

(Continued)

OTHER PUBLICATIONS

"What is Bit Masking?", Nov. 26, 2016, Stack Overflow, pp. 1-4 http://web.archive.org/web/20161126111540/https://stackoverflow.com/questions/10493411/what-is-bit-masking (Year: 2012).*

(Continued)

*Primary Examiner* — Reginald G Bragdon
*Assistant Examiner* — Curtis James Kortman
(74) *Attorney, Agent, or Firm* — McClure, Qualey & Rodack, LLP

(57) ABSTRACT

High performance data storage device is disclosed, which has a memory controller dynamically updating mapping information on the temporary storage to manage physical space information mapped to a logical address recognized by a host. The memory controller uses a first bit to an $N_{th}$ bit of the physical space information to indicate a physical space of the non-volatile memory or a cache address of the data cache space, without using additional bits to map the physical space information to the non-volatile memory or the data cache space, where N is a number greater than one. Among numbers formed by the first to the $N_{th}$ bit, the memory controller uses numbers corresponding to non-existent physical space of the non-volatile memory to map the physical space information to the non-volatile memory or the data cache space.

8 Claims, 4 Drawing Sheets

(56) References Cited

U.S. PATENT DOCUMENTS

| | | | |
|---|---|---|---|
| 8,112,574 B2 | 2/2012 | Lee et al. | |
| 9,268,706 B2 | 2/2016 | Kunimatsu et al. | |
| 9,383,927 B2 | 7/2016 | Thomas | |
| 9,460,025 B1 | 10/2016 | Wallace et al. | |
| 9,529,731 B1 | 12/2016 | Wallace et al. | |
| 10,635,358 B2 | 4/2020 | Hsiao et al. | |
| 10,810,123 B1 | 10/2020 | Xu et al. | |
| 2003/0204702 A1* | 10/2003 | Lomax, Jr. | G06F 12/0292 711/207 |
| 2010/0077136 A1* | 3/2010 | Ware | G06F 12/0804 711/103 |
| 2012/0166723 A1 | 6/2012 | Araki et al. | |
| 2014/0032818 A1* | 1/2014 | Chang | G06F 12/0802 711/103 |
| 2014/0082265 A1 | 3/2014 | Cheng | |
| 2014/0181415 A1 | 6/2014 | Loh et al. | |
| 2014/0223071 A1 | 8/2014 | Bert et al. | |
| 2014/0223079 A1 | 8/2014 | Zhang et al. | |
| 2015/0339058 A1 | 11/2015 | Yoshii et al. | |
| 2016/0004642 A1 | 1/2016 | Sugimoto et al. | |
| 2016/0124649 A1 | 5/2016 | Liu et al. | |
| 2016/0291878 A1 | 10/2016 | Kang | |
| 2017/0083451 A1 | 3/2017 | Tan | |
| 2017/0308396 A1 | 10/2017 | Hsieh | |
| 2018/0196747 A1 | 7/2018 | Tang | |
| 2019/0057038 A1 | 2/2019 | Haswell | |
| 2019/0227931 A1 | 7/2019 | Jung | |
| 2019/0310944 A1* | 10/2019 | Rudoff | G06F 12/0897 |
| 2020/0264984 A1 | 8/2020 | Adams et al. | |

FOREIGN PATENT DOCUMENTS

| | | |
|---|---|---|
| TW | 201810017 A | 3/2018 |
| TW | 201826126 A | 7/2018 |
| TW | 1660346 B | 5/2019 |

OTHER PUBLICATIONS

Non-Final Office Action dated Nov. 9, 2020, issued in U.S. Appl. No. 16/585,583 (copy not provided).

Non-Final Office Action dated Mar. 26, 2021, issued in U.S. Appl. No. 16/728,294 (copy not provided).

Final Office Action dated Apr. 5, 2021, issued in U.S. Appl. No. 16/585,583 (copy not provided).

* cited by examiner

| The total block number | TotalFBlk | ShiftCnt | ValidBlk | DummySrc | DRAMSrc |
|---|---|---|---|---|---|
| 504 | 0x1F8 | 21 | 0x3F000000 | 0x3FE00000 | 0x3FC00000 |
| 236 | 0xEC | 21 | 0x3B000000 | 0x3FC00000 | 0x3F800000 |
| 1008 | 0x3D0 | 21 | 0x7E000000 | 0x7FE00000 | 0x7FC00000 |

DATA STORAGE DEVICE AND CONTROL METHOD FOR NON-VOLATILE MEMORY

CROSS REFERENCE TO RELATED APPLICATIONS

This Application claims the benefit of U.S. Provisional Application No. 62/810,422, filed on Feb. 26, 2019, the entirety of which is incorporated by reference herein.

This Application also claims priority of Taiwan Patent Application No. 108127457, filed on Aug. 2, 2019, the entirety of which is incorporated by reference herein.

BACKGROUND OF THE INVENTION

Field of the Invention

The present invention is related to data storage devices, and particularly related to mapping information management.

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as the storage medium in a data storage device.

Non-volatile memory typically has its particular storage characteristics. The technical field needs to develop the corresponding control technology.

BRIEF SUMMARY OF THE INVENTION

This application proposes a physical space information format to manage mapping information of a data storage device.

A data storage device in accordance with an exemplary embodiment of the present invention includes a non-volatile memory, a memory controller, and a temporary storage. The memory controller accesses the non-volatile memory as requested by a host. The memory controller plans a data cache space on the temporary storage. The memory controller dynamically updates mapping information on the temporary storage to manage physical space information mapped to a logical address recognized by the host. The memory controller uses a first bit to an $N_{th}$ bit of the physical space information to indicate the physical space of the non-volatile memory or the cache address of the data cache space, without using additional bits to map the physical space information to the non-volatile memory or the data cache space, where N is a number greater than one. Among the numbers formed by the first to the $N_{th}$ bit, the memory controller uses numbers corresponding to non-existent physical space of the non-volatile memory to map the physical space information to the non-volatile memory or the data cache space.

According to the present invention, the bits of the physical space information are optimally utilized to cope with large-sized non-volatile memory.

In an exemplary embodiment, the memory controller uses a mask to mask the physical space information and thereby generates a judgment value. According to the judgment value, the memory controller maps the physical space information to the non-volatile memory or the data cache space. Based on the judgment value, the memory controller further determines whether the physical space information is dummy information.

In an exemplary embodiment, the memory controller uses a mask to mask the physical space information and thereby generates a judgment value. When the judgment value is a first value, the memory controller determines that the physical space information is dummy information. When the judgment value is a second value, the memory controller maps the physical space information to the data cache space. When the judgment value is neither the first value nor the second value, the memory controller maps the physical space information the non-volatile memory.

The memory controller may use the mask to perform a logical AND operation on the physical space information.

In an exemplary embodiment, the non-volatile memory is a flash memory. The bit number required to distinguish different blocks of the flash memory is BlkBits. The bit number required to distinguish different units of each block is UnitBits. The memory controller performs a calculation, $$\text{Mask}=(((1<<\text{BlkBits})-1)*(1<<\text{UnitBits})),$$

where Mask is the mask.

The memory controller may further perform the following calculations, $$\text{DummySrc}=\text{Mask; and}$$

$$\text{DRAMSrc}=(((1<<\text{BlkBits})-2)*(1<<\text{UnitBits})),$$

where DummySrc is the first value and DRAMSrc is the second value.

The aforementioned memory controller for non-volatile memory may be implemented in other architectures. In an exemplary embodiment, a non-volatile memory control method based on the foregoing concept, including the following steps: accessing a non-volatile memory as requested by a host; planning a data cache space on the temporary storage; dynamically updating mapping information on the temporary storage to manage physical space information mapped to a logical address recognized by the host; using a first bit to an $N_{th}$ bit of the physical space information to indicate the physical space of the non-volatile memory or the cache address of the data cache space, without using additional bits to map the physical space information to the non-volatile memory or the data cache space, where N is a number greater than one; and among the numbers formed by the first to the $N_{th}$ bit, using numbers corresponding to non-existent physical space of the non-volatile memory to map the physical space information to the non-volatile memory or the data cache space.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4 depicts a table 400 which shows the setting of the first value (Dummy Src) and the second value (DRAMSrc).

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 2:
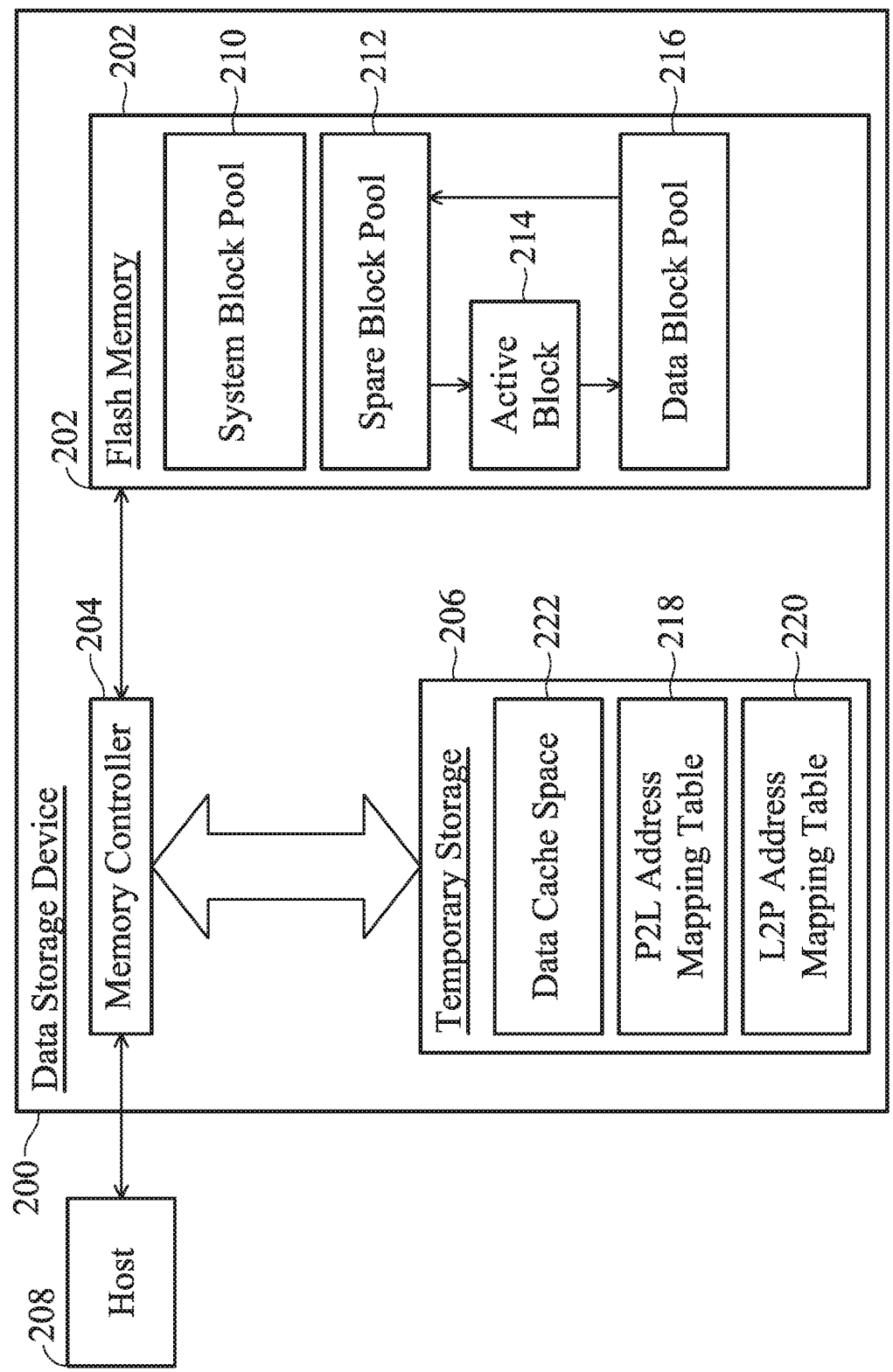
FIG. 2 is a block diagram illustrating a data storage device 200 in accordance with an exemplary embodiment of the present invention.

FIG. 2 is a block diagram illustrating a data storage device 200 in accordance with an exemplary embodiment of the present invention, which includes a flash memory 202, a memory controller 204, and a temporary storage 206. A host 208 operates the flash memory 202 through the memory controller 204. The data storage device 200 may perform optimization operations on the flash memory 202 without commands from the host 208. For example, the memory controller 204 may perform garbage collection (GC), space trimming, block data transfer, and so on, to optimize the flash memory 202. The memory controller 204 uses the temporary storage 206 to store the temporary data required during the operations of the flash memory 202. The temporary storage 206 may be a dynamic random access memory (DRAM) or a static random access memory (SRAM).

In addition to the system block pool 210 storing a logical-to-physical addresses mapping table (L2P), the flash memory 202 has other blocks changing between multiple states. An active block 214 taken from a spare block pool 212 is programmed by the write data transferred from the host 208. After being closed (for example, after an EOB (end of block) information writing), the active block 214 is regarded as a data block and belongs to a data block pool 216. A substitute for the active block 214 is selected from the spare block pool 212. An erase operation is required to release a data block to the spare block pool 212. In some exemplary embodiments, the active block 214 may be used as the destination for internal data movement of the flash memory 202.

Figure 1:
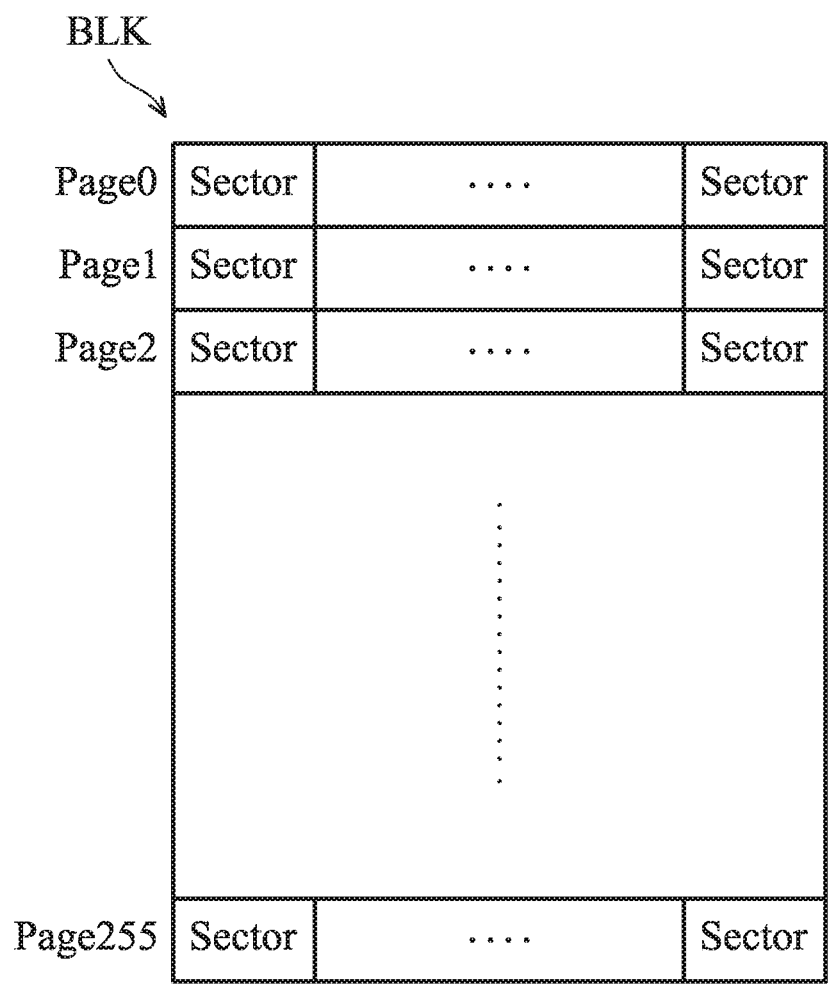
FIG. 1 illustrates the structure of a block BLK, including a plurality of pages (e.g., Page0 . . . Page255)

The physical space of the flash memory 202 is divided into a plurality of blocks. FIG. 1 illustrates the structure of a block BLK, including a plurality of pages (e.g., Page0 . . . Page255). Each page includes a plurality of sectors (e.g. 32 sectors within one page of 16 KB). Each sector may be 512B. In a 4 KB data management mode, the smallest data management unit is 8 sectors. Eight sectors of user data should be managed together. For simplicity, the following discussion is based on the 4 KB data management mode, but not limited thereto.

As the active block 214 is filled in, the memory controller 204 may dynamically manages a physical-to-logical (P2L) address mapping table 218 on the temporary storage 206 to record the logical address of the user data stored to the active block 214 (or, to record mapping information that maps physical addresses to logical addresses). As recorded in the P2L mapping table 218, the active block 214 stores user data of several logical addressed. The reversed mapping information may be used to update a logical-to-physical (L2P) address mapping table. The memory controller 204 may load the L2P address mapping table (partially or fully) to the space 220 of the temporary storage 206 to speed the L2P mapping table accessing.

In an exemplary embodiment, the memory controller 204 stores user data to the blocks according to the page number (from low to high number, e.g., from Page0 to Page255). In an exemplary embodiment, the data storage device 200 adopts a multi-channel technology, which regards several blocks accessed through the different channels as one super block, and treats pages among the different blocks as a super page. Data erasure/writing is in units of super blocks/pages. The data throughput of the data storage device 200 is raised by the super block/page design.

The flash memory 202 has its special storage characteristics. The new data is not overwritten on the old data. The new version of data needs to be programmed to a spare space, and the old data is marked as invalid. The piecemeal valid data in the blocks is collected to a spare space by garbage collection. Blocks contain only invalid data is released to be erased and reused.

The physical space of the flash memory 202 is dynamically configured for use. Logical addresses (for example, the logical block address LBA or the global host page number GHP, . . . , etc.) are used at the host side to distinguish the user data. How the logical addresses map to the physical space (identified by physical addresses) of the flash memory 202 is recorded in the L2P address mapping table. The physical address typically is represented by a block number, a page number, and a data management unit number. The data management unit number may be represented by an offset value. In the multi-channel accessing architecture, the physical address may further include a channel number, a logical unit number (LUN), a plane number and other information.

The memory controller 204 needs to refer to or update the mapping information of the L2P address mapping table when operating the flash memory 202. For example, when the user data is read from the flash memory 202, the mapping information needs to be referred to. The mapping information needs to be updated when user data is programmed to the flash memory 202. In addition to respond to the read and write commands from the host, the memory controller 204 may actively or passively perform other operations on the flash memory 202, such as garbage collection, space trimming, block data moving, etc. These additional operations also refer to or update the mapping information of the L2P address mapping table.

In addition to temporarily storing the L2P address mapping table, the temporary storage 206 may also have a portion of space planned as a data cache space 222. When there is user data cached in the data cache space 222 of the temporary storage 206, the physical space information recorded in the L2P address mapping table indicates the cache address of the temporary storage 206, rather than the physical space of the flash memory 202. In order to avoid confusion of the physical space information identification (mapping the temporary storage 206 or the flash memory 202), the memory controller 204 may utilize exclusive bits in the binary representation of the physical space information to identify the cached data from the data stored in the flash memory 202. For example, a format of a 32-bit (four bytes) physical space information is:

Bit [31]: an UNC bit, for an UNC command of NVMe (Non-Volatile Memory Host Controller Interface Specification);

Bits [30:29]: pattern mode bits. "00" or "01" represents that a physical address of the flash memory 202 is indicated by the subsequent bits [28:0]. "10" represents that a physical address of the temporary storage 206 is indicated by the subsequent bits [28:0]. "11" represents that the subsequent bits [28:0] are dummy bits.

Bits [28:0]: for recording a physical address. A block number may be recorded in bits [28:20]. A page number and some additional information (e.g., an offset, a channel number CH #, an LUN, a chip enable signal number CE #, a plane number, and so on) may be recorded in bits [19:00].

However, with the evolution of the flash memory 202 manufacturing technology, each block has more pages, and the flash memory 202 has more data storage space. Therefore, more bits are required to correctly indicate where the user data is stored. The conventional physical space information format used to form the L2P address mapping table is no longer applicable.

Therefore, the present invention proposes a powerful physical space information format to form an L2P address mapping table. In an exemplary embodiment, the 32-bit physical space information is:

Bit [31]: an UNC bit, for an UNC command of NVMe;

Bits [30:0]: for recording a physical address. A block number may be recorded in bits [30:22]. A page number and the additional information may be recorded in bits [21:00].

In the present invention, the values represented in the proposed format and corresponding to the non-existent physical space are utilized to indicate the pattern mode. Without planning exclusive bits to indicate the pattern mode, the available bits to form a physical address are increased (from 29 to 31 bits). Theoretically, 4 times the physical address range can be recorded. It means that 4 times the data storage space can be managed.

In the physical space information format of the present invention, no bits are exclusively planned to record the pattern mode. The pattern mode information is carried in the physical address bits. The values corresponding to the non-existent physical space are utilized to indicate the pattern mode. For example, among the bits [31:0], bits [30:22] are planned to record a block number. The maximum number represented by bits [30:22] is 511. However, the maximum block number of the flash memory 202 is 504, so the values 505 to 511 correspond to the non-existent physical space and can be utilized to indicate the pattern mode. For example, when getting a value 508, the binary representation is determined as indicating a physical address of the temporary storage 206. When getting a value 511, the binary representation is determined as containing dummy information. Logical operations, like "AND", "OR", "shift", "mask" and so on, may be used to determine a value from the bits [30:22].

Figure 3:
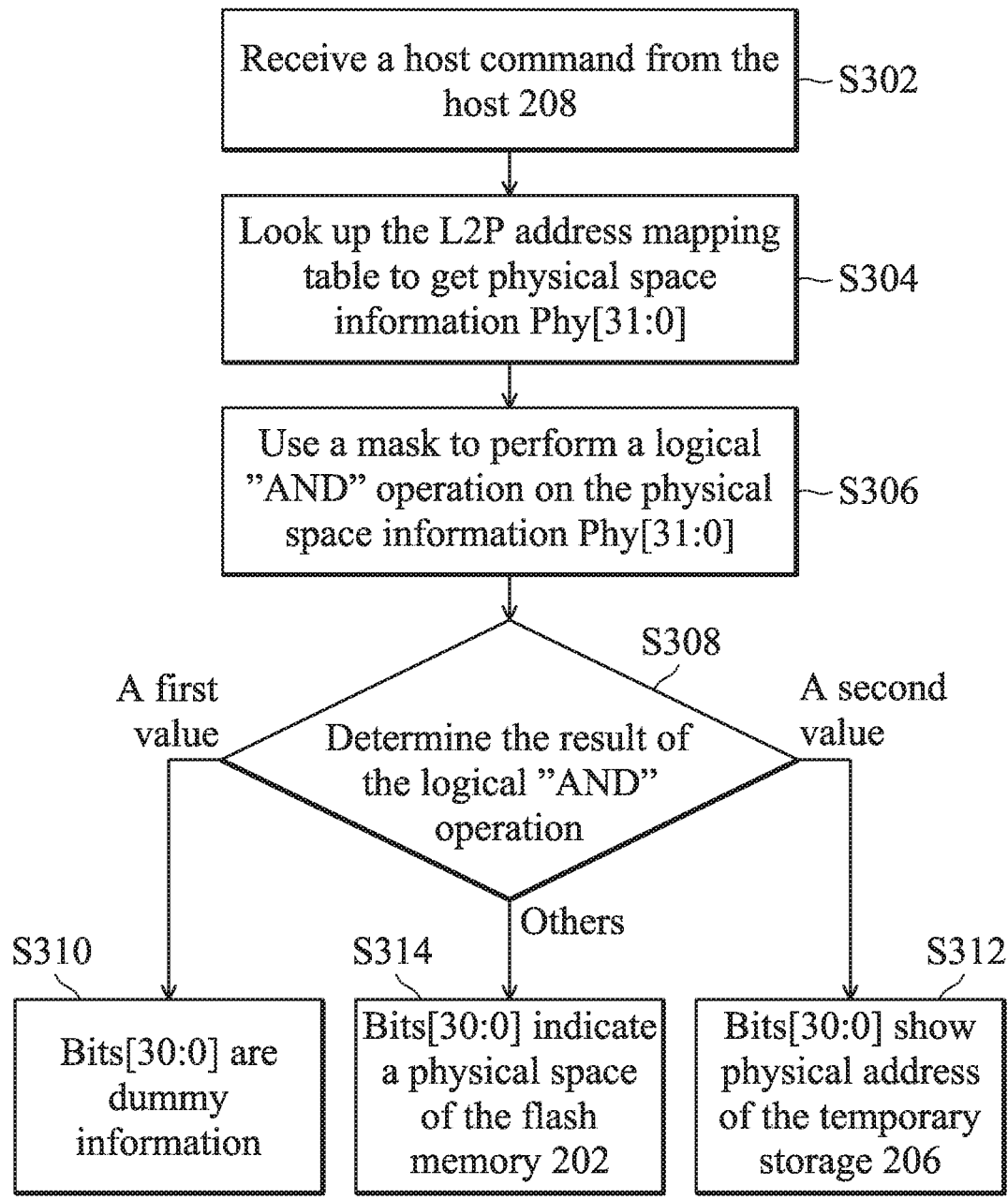
FIG. 3 is a flow chart of physical address identification in accordance with an exemplary embodiment of the present invention.

FIG. 3 is a flow chart of physical address identification in accordance with an exemplary embodiment of the present invention. In step S302, the memory controller 204 receives a host command from the host 208. The host command indicates a command identifier and a logical address. According to the command identifier, the host command may be a read command, a write command, a space trimming command, etc.

In step S304, the memory controller 204 looks up the L2P address mapping table according to the host command to get physical space information corresponding to the logical address indicated in the host command. For example, by looking up the L2P address mapping table, a value 0x1F054321 is obtained as the physical space information Phy[31:0].

In step S306, the memory controller 204 performs logical operations on the physical address (on all bits or just on specific bits of the binary representation of the physical space information) to obtain a judgment value. In an exemplary embodiment, the memory controller 204 performs logical operations on all 32 bits ([31:0]) of the physical space information. In another exemplary embodiment, the controller performs logical operations on just partial bits of the physical space information, such as bits [30:24]. In an exemplary embodiment, the obtained judgment value is "7D".

In step S308, according to the judgment value, the memory controller 204 determines the type of the physical address carried in the physical space information. When the judgment value is the first value, the memory controller 204 proceeds to step S310 to determine the physical address as meaningless dummy information. When the judgment value is the second value, the memory controller 204 proceeds to step S312 to determine that the physical address indicates a space of the temporary storage 206. When the judgment value is neither the first nor the second value, the memory controller 204 proceeds to step S314 to determine that the physical address indicates a physical space of the flash memory 202.

FIG. 4 depicts a table 400. The setting of the first value (DummySrc) and the second value (DRAMSrc) are shown. The type of physical address is determined according to the first value (DummySrc) and the second value (DRAMSrc). The following equations may be used to set the first value (DummySrc) and the second value (DRAMSrc), which includes:

$$ValidBlk=(TotalFBlk<<ShiftCnt) \quad [eq. 1]$$

$$Mask=(((1<<BlkBits)-1)*(1<<ShiftCnt)) \quad [eq. 2]$$

$$DummySrc=Mask \quad [eq. 3]$$

$$DRAMSrc=(((1<<BlkBits)-2)*(1<<ShiftCnt)) \quad [eq. 4]$$

Referring to the first line of FIG. 4, the total block number within one plane is 504 (0x1F8 in hex, which is labeled by TotalFBlk), and the shift amount ShiftCnt is 21 bits (which can be realized as UnitBits, the number of bits for recognizing the different writing/storage units of one block). According to equation 1, the binary representation of TotalFBlk is shifted to the left by the shift amount ShiftCnt, and thereby the maximum valid block number ValidBlk is calculated, which is 0x3F000000. The values greater than ValidBlk (0x3F000000) can be used to set DummySrc and DRAMSrc.

A value exceeding ValidBlk is selected to set a value Mask. According to equation 2, the calculated Mask is 0x3FE00000 when the number of block bits BlkBits is 9 and the shift amount ShiftCnt is 21. 0x3FE00000, the Mask, can be used to implement the logical operations of step S306 to determine the physical address type.

According to equation 3, the value of Mask is assigned to the first value DummySrc. That is, DummySrc is equal to 0x3FE00000, too. Then, according to equation 4, the second value DRAMSrc is calculated and is 0x3FC00000. The physical address type identification of step S308 is based on the calculated values of DummySrc and DRAMSrc.

Referring to the second line of FIG. 4, the total block number of one plane is 236, the hex representation TotalFBlk of the total block number is 0xEC, and the shift amount ShiftCnt is 21 bits. According to equation 1, after shifting TotalFBlk to the left by the shift amount ShiftCnt, the valid block number ValidBlk is 0x3B000000. In this example, DummySrc is 0x3FC00000 and DRAMSrc is 0x3F800000.

Referring to the third line of FIG. 4, the total block number of one plane is 1008, the hex representation TotalFBlk of the total block number is 0x3D0, and the shift amount ShiftCnt is 21 bits. According to equation 1, after shifting TotalFBlk to the left by the shift amount ShiftCnt, the valid block number ValidBlk is 0x7E000000. In this example, DummySrc is 0x7FE00000 and DRAMSrc is 0x7FC00000.

The memory controller 204 controlling the flash memory 202 may be implemented in other architectures. Any techniques using the free numbers greater than the maximum valid number, e.g., ValidBlk, of the physical space number to identify the pattern mode are in the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a memory controller and a temporary storage,
wherein:
the memory controller accesses the non-volatile memory as requested by a host;
the memory controller plans a data cache space in the temporary storage;
the memory controller dynamically updates mapping information on the temporary storage to manage physical space information mapped to a logical address recognized by the host;
the memory controller uses a first bit to an Nth bit of the physical space information to represent dummy information, or to indicate a physical space of the non-volatile memory or a cache address of the data cache space, without using additional bits to map the physical space information to the non-volatile memory or the data cache space, where N is a number greater than one;
among numbers formed by the first to the Nth bit, the memory controller uses numbers corresponding to non-existent physical space of the non-volatile memory to represent the dummy information, or to map the physical space information to the non-volatile memory or the data cache space;
the memory controller uses a mask to mask the physical space information and thereby generates a judgment value;
when the judgment value is a first value, the memory controller determines that the physical space information is the dummy information;
when the judgment value is a second value, the memory controller maps the physical space information to the data cache space; and
when the judgment value is neither the first value nor the second value, the memory controller maps the physical space information to the non-volatile memory.

2. The data storage device as claimed in claim 1, wherein:
the memory controller uses the mask to perform a logical AND operation on the physical space information.

3. The data storage device as claimed in claim 2, wherein:
the non-volatile memory is a flash memory;
a first bit number required to distinguish different blocks of the flash memory is BlkBits;
a second bit number required to distinguish different units of each block is UnitBits; and
the memory controller performs a calculation, $$Mask=(((1<<BlkBits)-1)*(1<<UnitBits)),$$

where Mask is the value of the mask.

4. The data storage device as claimed in claim 3, wherein the memory controller performs calculations of:
Dummy Src=Mask; and $$DRAMSrc=(((1<<BlkBits)-2)*(1<<UnitBits)),$$

where DummySrc is the first value and DRAMSrc is the second value.

5. A non-volatile memory control method, comprising:
accessing a non-volatile memory as requested by a host;
planning a data cache space on a temporary storage;
dynamically updating mapping information on the temporary storage to manage physical space information mapped to a logical address recognized by the host;
using a first bit to an Nth bit of the physical space information to represent dummy information, or to indicate a physical space of the non-volatile memory or a cache address of the data cache space, without using additional bits to map the physical space information to the non-volatile memory or the data cache space, where N is a number greater than one;
among numbers formed by the first to the Nth bit, using numbers corresponding to non-existent physical space of the non-volatile memory to represent the dummy information, or to map the physical space information to the non-volatile memory or the data cache space;
using a mask to mask the physical space information and thereby generating a judgment value;
when the judgment value is a first value, determining that the physical space information is the dummy information;
when the judgment value is a second value, mapping the physical space information to the data cache space; and
when the judgment value is neither the first value nor the second value, mapping the physical space information to the non-volatile memory.

6. The non-volatile memory control method as claimed in claim 5, wherein:
   a logical AND operation is performed on the mask and the physical space information.

7. The non-volatile memory control method as claimed in claim 6, wherein:
   the non-volatile memory is a flash memory;
   a first bit number required to distinguish different blocks of the flash memory is BlkBits;
   a second bit number required to distinguish different units of each block is UnitBits; and
   a calculation, Mask=(((1<<BlkBits)−1)*(1<<UnitBits)), is performed, where Mask is the value of the mask.

8. The non-volatile memory control method as claimed in claim 7, further performing calculations of:
   Dummy Src=Mask; and DRAMSrc=(((1<<BlkBits)−2)*(1<<UnitBits)), where DummySrc is the first value and DRAMSrc is the second value.

\* \* \* \* \*